US008576957B2

(12) United States Patent
Andrews

(10) Patent No.: US 8,576,957 B2
(45) Date of Patent: Nov. 5, 2013

(54) PROCESSING DIGITAL SAMPLES IN A WIRELESS RECEIVER

(75) Inventor: Edward Andrews, Bristol (GB)

(73) Assignee: Icera, Inc., Wilimington, DE (US)

( * ) Notice: Subject to any disclaimer, the term of this patent is extended or adjusted under 35 U.S.C. 154(b) by 324 days.

(21) Appl. No.: 12/933,377

(22) PCT Filed: Feb. 27, 2009

(86) PCT No.: PCT/EP2009/052360
§ 371 (c)(1),
(2), (4) Date: Oct. 13, 2010

(87) PCT Pub. No.: WO2009/115401
PCT Pub. Date: Sep. 24, 2009

(65) Prior Publication Data
US 2011/0019780 A1    Jan. 27, 2011

(30) Foreign Application Priority Data

Mar. 18, 2008 (GB) .................................. 0805050.2

(51) Int. Cl.
*H04L 27/06*    (2006.01)
*H04B 7/005*    (2006.01)

(52) U.S. Cl.
USPC ............................................ 375/340; 455/69

(58) Field of Classification Search
USPC ......... 375/259, 316, 340, 341, 346, 285, 354, 375/358; 455/91, 127.1, 39, 68, 69, 500, 455/507, 517, 522
See application file for complete search history.

(56) References Cited

U.S. PATENT DOCUMENTS

| 2003/0114179 A1* | 6/2003 | Smolyar et al. | 455/522 |
| 2004/0116142 A1* | 6/2004 | Wang et al. | 455/522 |
| 2005/0143112 A1 | 6/2005 | Jonsson | |
| 2006/0121928 A1* | 6/2006 | Itsuki | 455/522 |

FOREIGN PATENT DOCUMENTS

| JP | 2002077010 A | 3/2002 |
| JP | 2007243504 A | 9/2007 |
| JP | 2007527675 A | 9/2007 |
| WO | 2005/084379 A2 | 9/2005 |
| WO | 2007107805 A1 | 9/2007 |

OTHER PUBLICATIONS

On the implementation of a multi-equalizer; Philippe Dumais, et al.; IEEE 2005; 4 pages.
Foreign Communication From a Related Counterpart Application, Japanese Application 2011-500142, Japanese Office Action dated Feb. 5, 2013, 4 pages.

* cited by examiner

*Primary Examiner* — Sam K Ahn
*Assistant Examiner* — Vineeta Panwalkar

(57) ABSTRACT

A system and method for processing digital samples from a signal received via a wireless transmission channel in a wireless communications system. The method comprises: comparing a target signal quality value with an estimated received signal quality value; detecting if the estimated received signal quality value exceeds the target signal quality value for a period; and selecting one of a plurality of processing routines of differing sensitivities for processing the digital samples.

16 Claims, 5 Drawing Sheets

| Algorithm | Impl. | Sensitivity |
|---|---|---|
| ALG 1 | Imp 1 | |
| | Imp 2 | |
| | Imp 3 | |
| ALG 2 | Imp 1 | |
| | Imp 2 | |
| | Imp 3 | |

PROCESSING DIGITAL SAMPLES IN A WIRELESS RECEIVER

CROSS-REFERENCE TO RELATED APPLICATIONS

This application is the National Stage of, and therefore claims the benefit of, International Application No. PCT/EP2009/052360 filed on Feb. 27, 2009, entitled "PROCESSING DIGITAL SAMPLES IN A WIRELESS RECEIVER," which was published in English under International Publication Number WO 2009/115401 on Sept. 24, 2009, and has a priority date of Mar. 18, 2008, based on the application GB 0805050.2. The above applications are commonly assigned with this National Stage application and are incorporated herein by reference in their entirety.

The present invention relates to a radio receiver in a wireless communications system, and to a method of processing radio signals.

The transmission of radio signals in modern wireless communications can be realized based on a number of different communications systems, often specified by a standard. There are increasing requirements for devices which are able to operate to support more than one of these wireless communications systems. Mobile radio receiver devices include analog radio frequency (RF)/intermediate frequency (IF) stages, which are arranged to receive and transmit wireless signals via one or more antennas. The output of the RF/IF stages is typically converted to baseband, where an Analog-to-Digital Converter (ADC) converts incoming analog signals to digital samples, which are then processed for signal detection and decoding of the information data carried by the signals. The ADC may alternatively operate directly at IF, in which case the conversion to baseband is performed in the digital domain. A number of different types of front end processing of the digital samples are known to Implement signal detection, including rake receiver processing and channel equalisation processing. Subsequent processing steps include decoding and error checking.

In Code-Division Multiple Access (CDMA) wireless systems, different physical channels are multiplexed in the code domain using separate spreading sequences. In the case of orthogonal spreading codewords, the original data symbols can then be effectively separated at the receiver by despreading.

In a Wideband COMA (WCDMA) cellular system, downlink code multiplexing is performed using Orthogonal Variable Spreading Factor (OVSF) codes. However, the OVSF codewords are orthogonal to each other only under the condition of perfect time alignment. In the presence of multipath propagation, the code orthogonality is lost, and the operation of despreading is effected by Multiple Access Interference (MAI).

For signal processing of information data received on the data channel (DCH), CDMA mobile radio receivers conventionally employ a rake processor which relies on the correlation properties of the spreading sequences. A rake processor is described for example in J. G. Proakis, "Digital Communications", New York: McGraw-Hill, 1995.

FIG. 1 is a schematic block diagram indicating the main functional components of a 3GPP wideband code division multiple access (WCDMA) receiver. Reference numeral 2 denotes an antenna which receives a wireless transmission and supplies it in analog form to RF and IF stages 4. A receiver front end 6 includes the functions of analog to digital conversion and supplies digital samples to a signal detection block 8. The signal detection block 8 can be implemented in a number of ways and is responsible for de-scrambling and de-spreading the received coded signal samples. The signal to interference-plus-noise ratio (SIR) of the received signal can be measured from the output of the signal detection block 8. For each time slot a block is received which comprises a plurality of transport channels (TrCH) multiplexed onto a dedicated physical channel (DPCH in 3GPP WCDMA), As shown in FIG. 1, after signal detection and channel decoding, the decoded data bits are supplied to a Cyclic Redundancy Check (CRC) block 12. The CRC check indicates whether or not the data block has been correctly decoded. The decoded data bits are also output as information data, which is used or not depending on the QoS measurements implemented in the receiver.

For interference-limited wireless systems, such as those based on CDMA technology, link adaptation is performed by a Transmit Power Control (TPC) mechanism, which ensures that sufficient but not excessive power is transmitted to achieve an adequate received signal quality. That is, the dedicated downlink power is actively controlled to give a specified QoS at minimum power. This QoS is achieved by implementing signal processing. In a way which will maintain the QoS, even at the minimum power level.

In a 3GPP WCDMA system, the power control mechanism comprises two parts: 1) a so-called "outer-loop" algorithm 14 that sets and adjusts a target signal to interference-plus-noise power ratio (SIR) in order to meet a Block Error Rate (BLER) target set by a network; and 2) a so-called "inner-loop" algorithm 16 that provides fast feedback to the transmitter in order that the transmitter can adjust its transmitted signal power so that the receiver SIR target is met, Feedback is in the form of up/down power commands transmitted as wireless signals. The inner-loop transmit power control 16 is typically based on the comparison between a target SIR ($SIR_t$) and an SIR estimated from the received signal ($SIR_{est}$). The outer-loop mechanism 14 increases or decreases the SIR target in response to the receipt of block error information (BEI), which is typically derived by the pass/fail of the CRC check 12. If a data block is received correctly (CRC pass) then the SIR target is decreased; if a data block is received incorrectly (CRC fail) then the SIR target is increased. In normal circumstances, the inner-loop power control is able to provide feedback to the transmitter to adjust the transmitted power to meet the new target in a short period (in WCDMA the power can be changed by 1 dB per slot). However, under certain conditions, such as when the transmitter has reached its minimum allowed transmit power, it may be the case that the actual SIR estimated at the receiver cannot decrease as low as the target SIR. In that case it is likely that the BLER will be lower than the target rate (it could even be zero).

It is an aim of the present invention to optimise the processing facilities of a receiver in a wireless communication environment, in particular taking into account required signal processing performance while minimising the computing resources and/or power consumption required, to obtain that processing performance.

According to one aspect of the present invention there is provided a method of processing digital samples from a signal received via a wireless transmission channel in a wireless communications system, the method comprising:

comparing a target signal quality value with an estimated received signal quality value; and detecting if the estimated received signal quality value exceeds the targets signal quality value for a period; and selecting one of a plurality of processing routines of differing sensitivities for processing the digital samples based on said detecting step.

The present invention is described in the context of 3GPP WCDMA, wherein there is a step of providing the result of the comparing step to a transmitter to adjust transmit power for the signal based on the comparing step, but it will readily be appreciated that it is applicable in other contexts.

The invention further provides a computer program product which when executed by a processor implements the above-defined method.

The method steps can be implemented at a receiver, which receives data blocks in said signal.

The invention is particularly valuable where a processing routine of lower sensitivity is selected when "excess" signal quality is detected for a period.

The plurality of processing routines can include different algorithms and/or different implementations of an algorithm. For example, processing choices that can be controlled include:
- the choice between equaliser versus rake receiver,
- rate matching algorithms (for example some repetition bits could be discarded), choosing reduced complexity algorithms in Viterbi decoding (for example reducing traceback length),
- HARQ implementation—some data symbols could be discarded rather than saved, channel estimation could be done at a lower rate.

The sensitivity of a processing routine represents its ability to deliver a specified quality of service (QoS) for processed information based on the quality of the input digital samples. The more sensitive the processing routine, the more capable it is of producing a specified QoS at lower Input quality levels, but the more MIPS (processing cycles of the processor executing the routine) and power it consumes in its execution. QoS can be represented by a number of different parameters, including Bit Error Rate (BER), Block Error Rate (BLER), throughput and latency. Input signal quality is determined by SIR measurements.

According to another aspect of the invention there is provided a receiver for use in a wireless communications system, the receiver comprising:
- means for receiving a signal transmitted from a transmitter via a wireless transmission channel;
- means for comparing a target signal quality value with an estimated received signal quality value for the blocks;
- means for detecting if the estimated received signal quality value exceeds the target signal quality value for a period;
- means for holding a plurality of processing routines of differing sensitivities; and
- selection means coupled to the detecting means and operable to select one of the plurality of processing routines of different sensitivities for processing the digital samples.

The target signal quality value can be used in power control, for example the receiver can comprise means for providing the result of the comparing step to the transmitter whereby the transmitter can adjust transmit power based on the comparing step, e.g. in a W-CDMA system.

The target signal quality value can alternatively/additionally be used for adaptive modulation and coding.

The invention also provides a mobile terminal for use in a wireless communications system comprising:
- a wireless interface for receiving and providing digital samples; and
- a receiver for processing the digital samples as defined hereinabove.

The invention also provides a wireless communications system comprising a receiver as defined hereinabove and a transmitter, wherein the transmitter is operable to adjust transmit power based on the results of the comparing step.

Detecting if the estimated received signal quality value (e.g. SIR) exceeds the target signal quality value can be done based directly on the comparing step or on a count of power commands provided to the transmitter as a result of the comparing step, or on a combination thereof.

For a better understanding of the present invention and to show how the same may be carried into effect, reference will now be made by way of example to the accompanying drawings, in which.

Figure 1:
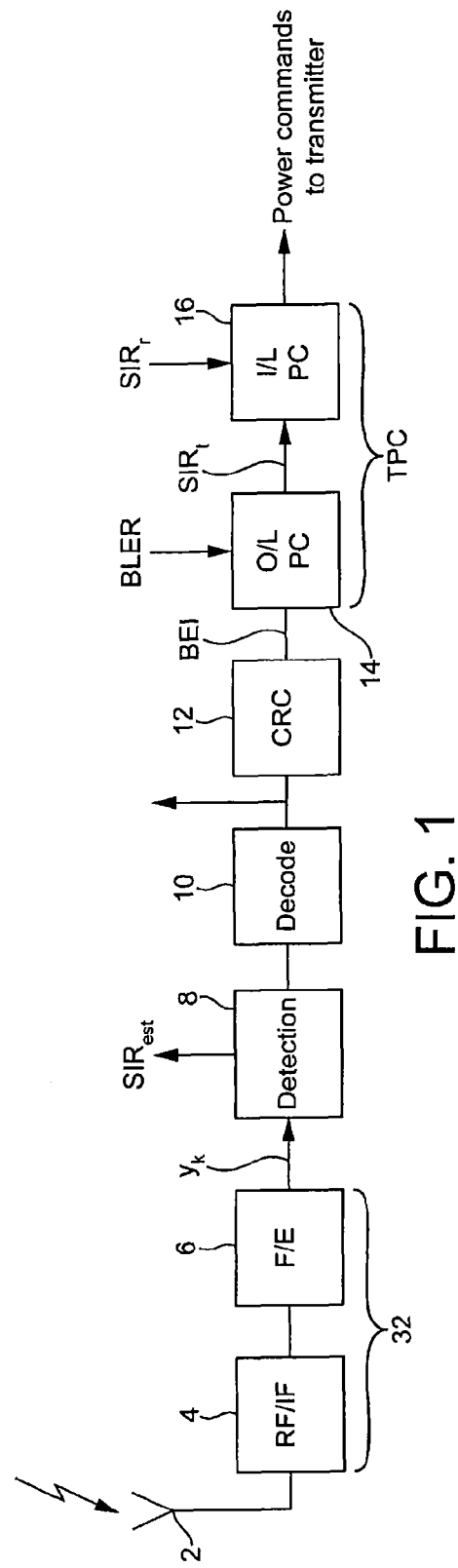
FIG. 1 is a schematic block diagram showing as functional blocks processing components of a wireless receiver.
Figure 2:
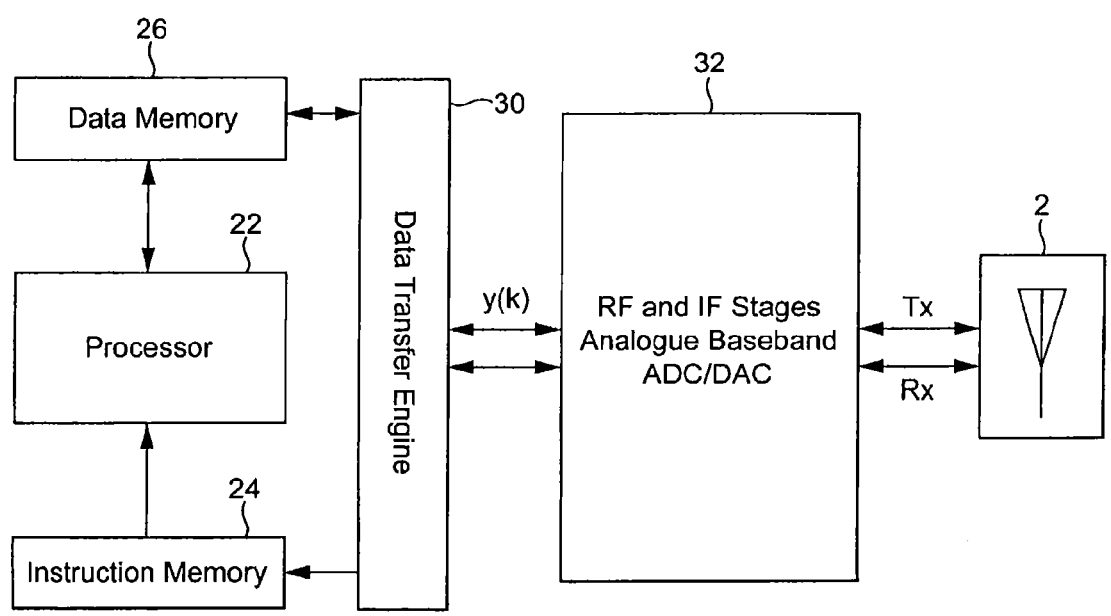
FIG. 2 is a schematic block diagram of the architecture of a wireless communications receiver.

FIG. 2 is a schematic architectural diagram of a device for transmitting and receiving signals in a wireless communications system. Such a device can be implemented in a number of different ways, but in accordance with FIG. 2 a series of RF/IF stages 32 (blocks 4, 6 in FIG. 1) is arranged to receive and transmit wireless signals (TX, RX) via one or more antennas 2. The received signal at the output of the RF/IF stages is typically converted to baseband, where an ADC converts the analog signal into digital samples. The block 32 of FIG. 2 includes components for processing the received radio signals and providing digital signal samples y(k). This can be achieved in different ways, which are known in the art and which are not discussed further herein.

The samples y(k) are supplied to a Data Transfer Engine 30 which communicates with a processor 22, an instruction memory 24 and a data memory 26. The processor 22 is responsible for processing the samples y(k). The processor 22 can execute a number of different functions which are held in an instruction memory 24 in the form of code sequences. This provides a so-called soft modem which has a number of advantages discussed further herein.

Figure 3A:
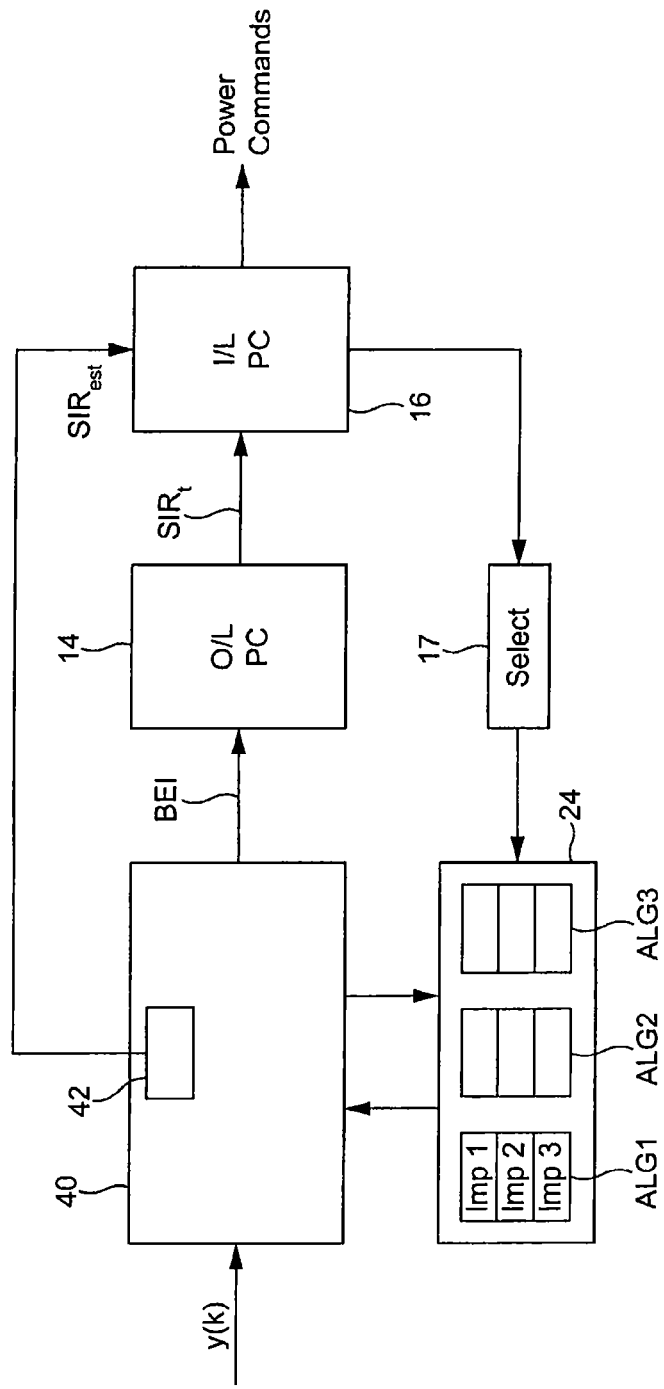
FIG. 3A is a functional block diagram illustrating one embodiment of selecting processing routines of differing sensitivities.

FIG. 3A is a schematic block diagram illustrating the principles of an embodiment of the present invention.

Components of a signal receiver are shown in functional block form. It will readily be appreciated that these components can be implemented in hardware or software or in any appropriate way and that the layout in FIG. 3 does not necessarily represent any physical layout. In the architecture described herein, which represents one non-limiting example of the invention, functional components are implemented by expecting code sequences in the processor 22, under the management of scheduling software.

A signal processing block 40 represents signal processing functions of the receiver including, for example, the functions of blocks 8, 10 and 12 in FIG. 1. Block 40 includes an estimation function 42 for estimating SIR of incoming blocks. This can be implemented in the signal detection function (8) which performs signal detection of the digital samples $y_k$ (e.g. by take processing) and, generally as a by-product of such processing, estimates a signal to interference ratio $SIR_{est}$ of the incoming digital samples for each block. The receiver maintains a target signal to interference ratio $SIR_t$ using an outer loop power control algorithm 14 which is known per se and which is not discussed further herein. The target signal to interference ratio $SIR_t$ and the estimated signal to interference ratio $SIR_{EST}$ are compared by an inner loop power control algorithm 16 which controls the transmission of TPC commands to a transmitter for increasing or decreasing the power of signals transmitted by the transmitter to the receiver. This mechanism has been briefly described in the preamble to the specification and is not described further herein because it is known to a person skilled in the art.

As an alternative to generating the estimated signal to interference ratio as a by-product of signal processing in signal detection block 8, a separate function could be provided to generate the estimated signal to interference ratio.

Signal processing carried out by the block 40 can be implemented using a number of different processing routines. These are shown diagrammatically in the form of separate code sequences held in the instruction memory 24. To implement a particular processing routine, the appropriate code sequence is loaded into the processor 22 and is executed to process the signals in accordance with that processing routine. Although the processing routines have been shown a separate code sequences, in fact the situation can be more complex than that. That is, the processing routines can be variations of the same algorithm (ALG1, ALG2, ALG3) having substantially a common code base and being varied by different parameters which can be recalled from the instruction memory 24 or the data memory 26. The implementations of the algorithms (processing routines) vary in sensitivity. That is, they vary in their ability to deliver the required quality of service as the received signal power level (as indicated by the estimated SIR) lowers. The more sensitive the processing routine, the better it is at generating a specified quality of service when implementing signal processing even at low SIRs. However, more sensitive processing routines generally utilise more MIPs and processing power. In a 3GPP user equipment, at the physical layer, QoS is specified by the choice of physical channel and the target BLER, chosen by the network.

As explained in the preamble to the specification, situations can arise where, as a result of the comparison in the inner loop power control algorithm 16, "down" power control commands are continuously sent back to the transmitter by the receiver even though the transmitter is already transmitting at its minimum power. Thus, these commands cannot be acted on and the result is that the transmitter continues to transmit at its minimum power. This is however excessive for the requirements of the receiver under the prevailing wireless conditions, since the receiver could accommodate receiving signals at a lower power level.

To optimise functionality of the receiver in these conditions, an embodiment of the invention provides a select function 17. The select function 17 considers the comparison between the estimated SIR and the target SIR which is implemented in the inner loop power control block 16. "Excess SIR" can be defined as the difference between the current target SIR and an averaged SIR estimate of the current SIR. If there is excess SIR for a suitable period, the select function 17 determines that the sensitivity of the processing functions can be reduced without degrading the delivered quality of service. Thus, it selects a processing routine of reduced sensitivity, that is a routine which is lower in sensitivity than the processing routine which is currently being utilised by the signal detection block 8. The period depends on the environment and is chosen to be long enough to avoid accidental excess SIR being detected, while being short enough to have an effect on operation of the processor. It is possible to increase sensitivity rapidly but decrease it more slowly. Sensitivity increase could be over a time period of around 50 ms, whereas decrease could be of the order of hundreds of milliseconds. The switching can depend on the algorithm: for example, the number of turbo iterations might change every 40 ms, whereas search parameters might change every 500 ms.

Figure 3B:
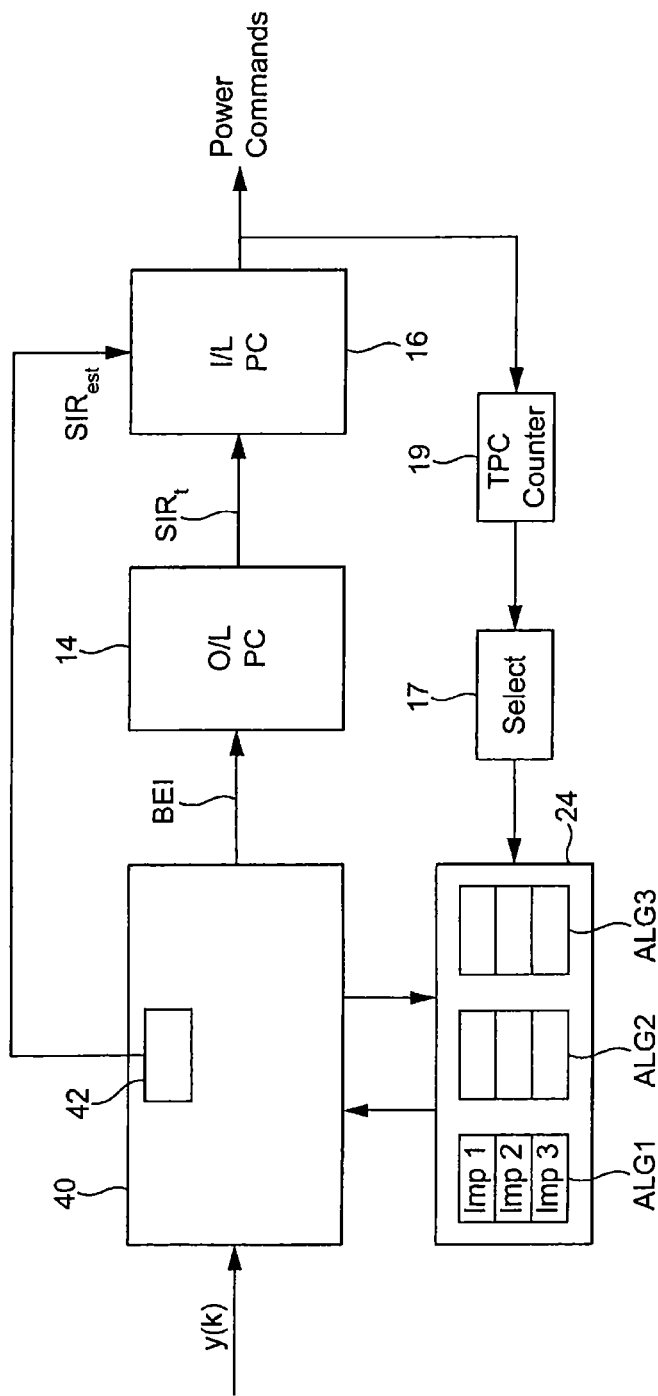
FIG. 3B is a functional block diagram of another embodiment of selecting processing routines.

An alternative embodiment is shown in FIG. 3B. In this embodiment, the selection of the processing routines is implemented based on a count of the TPC commands rather than a comparison between the target SIR and estimated SIR. The receiver checks the TPC commands that it is transmitting to the transmitter (counter 19). If more than a predetermined number, n, "down" commands are transmitted successively it is likely that the transmitter has reached its minimum power, and that the receiver is in an excess SIR state.

Conversely, when in an excess SIR state, if more than a predetermined number of TPC commands are determined as "up" commands, it can be established that the receiver is no longer in an excess SIR state, and it may be necessary to re-establish a processing routine of increased sensitivity.

Ways in which the processing routine can be varied to affect its sensitivity include the following:
- the oversampling rate and quality of an oversampling filter in rake processing (block 8) can be reduced;
- the number of rake fingers in rake processing (block 8) can be reduced;
- searcher parameters e.g. thresholds, search rate (implemented in control code which decides how often to run the search);
- the number of turbo iterations in a turbo decode function (block 10) can be reduced.

A further possibility is to discard altogether data which is associated with an SNR ratio that is so low as to indicate that the data is likely to be of such poor quality that it is not worth processing.

Figures 4, 5:
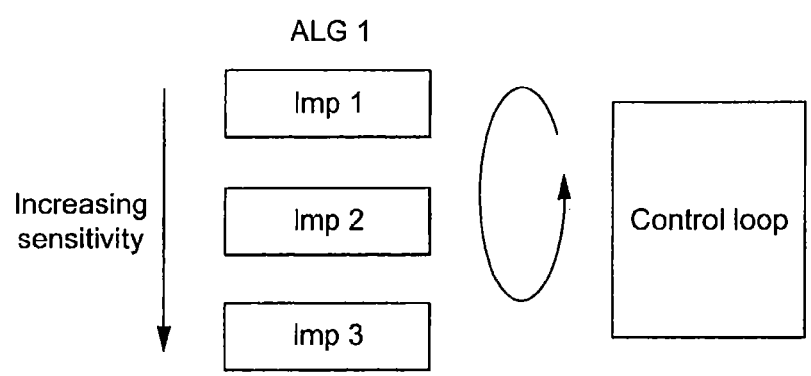
FIG. 4 is a schematic diagram of a table holding processing routines of differing sensitivities.
FIG. 5 is a schematic block diagram of implementation of a control loop.

The processing routines can represent implementations of similar algorithms, as explained above. In that case, the sensitivity degradation for each implementation can be bounded in a calibration table. FIG. 4 illustrates one example of a calibration table.

Alternatively, FIG. 5 illustrates schematically that for each algorithm the various implementations can be ordered, with a control loop reducing the implementation quality as long as the excess SIR remains above a threshold. The control loop can itself be implemented by executing a code sequence on processor 22.

The embodiment of FIG. 5 which implements a control loop is particularly valuable when controlling the choice of rate of channel estimation, when the sensitivity reduction varies depending on the channel.

The invention claimed is:

1. A method of processing digital samples from a signal received from a transmitter via a wireless transmission channel in a wireless communications system, the method comprising:
   comparing a reference target signal quality value with an estimated received signal quality value;
   providing the result of the comparing step to the transmitter to adjust transmit power for the signal based on the comparing step;
   detecting if the estimated received signal quality value exceeds the reference target signal quality value for a period, to thereby detect an excess signal quality; and
   selecting one of a plurality of processing routines of differing sensitivities for processing the digital samples based on the detecting step, wherein when the excess signal quality is detected, a processing routine with a sensitivity less than a sensitivity of a processing routine currently being utilized to process the digital samples is selected.

2. A method according to claim 1, comprising the step of generating the estimated received signal quality value.

3. A method according to claim 2, wherein the signal comprises blocks and the step of generating the estimated received signal quality value for a block is implemented during processing of digital samples for that block.

4. A method according to claim 1, wherein the plurality of processing routines include different implementations of an algorithm; signal detection routines; decoding routines; filtering routines; estimation routines.

5. A method according to claim 1, wherein the detecting step is based on the comparing step.

6. A method according to claim 1, wherein the providing step comprises sending power commands to the transmitter, wherein a down power command instructs the transmitter to reduce its transmit power.

7. A method according to claim 6, wherein the detecting step comprises counting the down power commands until a predetermined number have been sent.

8. A receiver for use in a wireless communications system, the receiver comprising:
an antenna configured to receive a signal transmitted from a transmitter via a wireless transmission channel;
a memory configured to hold a plurality of processing routines of differing sensitivities; and
a processor configured to:
compare a reference target signal quality value with an estimated received signal quality value for blocks of the received signal;
provide the result of the comparing to the transmitter whereby the transmitter can adjust transmit power based on the comparing;
detect if the estimated received signal quality value exceeds the reference target signal quality value for a period, to thereby detect an excess signal quality; and
select one of the plurality of processing routines of different sensitivities for processing received digital samples, wherein when the excess signal quality is detected, a processing routine with a sensitivity less than a sensitivity of a processing routine currently being utilized to process the digital samples is selected.

9. A receiver according to claim 8, wherein the memory is further configured to store a plurality of said processing routines which comprise different implementations of an algorithm, each implementation being stored with an associated sensitivity.

10. A receiver according to claim 8, wherein the processor is further configured to provide a control loop operable to select from an ordered set of processing routines of differing sensitivities.

11. A receiver according to claim 8, wherein the processor is further configured to evaluate an output from the comparing.

12. A receiver according to claim 8, wherein the processor is further configured to send power commands to the transmitter, wherein a down power command instructs the transmitter to reduce its transmit power.

13. A receiver according to claim 12, wherein the processor is further configured to count down power commands until a predetermined number have been sent.

14. A mobile terminal for use in a wireless communications system comprising:
a wireless interface configured to receive and provide digital samples; and
a receiver configured to process the digital samples, the receiver including:
an antenna configured to receive a signal transmitted from a transmitter via a wireless transmission channel,
a memory configured to hold a plurality of processing routines of differing sensitivities; and
a processor configured to:
compare a reference target signal quality value with an estimated received signal quality value for the blocks of the received signal,
provide the result of the comparing to the transmitter whereby the transmitter can adjust transmit power based on the comparing,
detect if the estimated received signal quality value exceeds the reference target signal quality value for a period, to thereby detect an excess signal quality, and
select one of the plurality of processing routines of different sensitivities for processing received digital samples, wherein when the excess signal quality is detected, wherein when the excess signal quality is detected, a processing routine with a sensitivity less than a sensitivity of a processing routine currently being utilized to process the digital samples is selected.

15. A computer program product comprising:
program code stored on a non-transitory computer readable medium which, when executed by a processor, carry out the steps of a method of processing digital samples from a signal received from a transmitter via a wireless transmission channel in a wireless communications system, the method including:
comparing a reference target signal quality value with an estimated received signal quality value;
providing the result of the comparing step to the transmitter to adjust transmit power for the signal based on the comparing step;
detecting if the estimated received signal quality value exceeds the reference target signal quality value for a period, to thereby detect an excess signal quality; and
selecting one of a plurality of processing routines of differing sensitivities for processing the digital samples based on the detecting step, wherein when the excess signal quality is detected, a processing routine with a sensitivity less than a sensitivity of a processing routine currently being utilized to process the digital samples is selected.

16. A wireless communications system, comprising:
a receiver including:
an antenna configured to receive a signal transmitted from a transmitter via a wireless transmission channel,
a memory configured to hold a plurality of processing routines of differing sensitivities; and
a processor configured to:
compare a reference target signal quality value with an estimated received signal quality value for blocks of the received signal,
provide the result of the comparing to the transmitter whereby the transmitter can adjust transmit power based on the comparing, detect if the estimated received signal quality value exceeds the reference target signal quality value for a period, to thereby detect an excess signal quality, and select one of the plurality of processing routines of different sensitivities for processing received digital samples, a processing routine with a sensitivity less than a sensitivity of a processing routine currently being utilized to process the digital samples is selected; and a transmitter, wherein the transmitter is operable to adjust transmit power based on the results of the comparing.

* * * * *